United States Patent [19]

Frank

[11] Patent Number: 5,255,376
[45] Date of Patent: Oct. 19, 1993

[54] METHOD AND APPARATUS FOR SUPPORTING A DUAL BIT LENGTH PROTOCOL FOR DATA TRANSFERS

[75] Inventor: Edward H. Frank, Portola Valley, Calif.

[73] Assignee: Sun Microsystems, Inc., Mountain View, Calif.

[21] Appl. No.: 820,561

[22] Filed: Jan. 14, 1992

[51] Int. Cl.[5] .................................. G06F 13/42
[52] U.S. Cl. ........................... 395/325; 364/DIG. 1; 364/230.4; 364/240.8; 364/240; 364/240.3
[58] Field of Search ............... 395/325, 500, 200; 340/825.06, 825.07, 825.08

[56] References Cited

U.S. PATENT DOCUMENTS

| | | | |
|---|---|---|---|
| 5,109,332 | 4/1992 | Culley | 395/325 |
| 5,109,490 | 4/1992 | Arimilli et al. | 395/325 |
| 5,113,369 | 5/1992 | Kinoshita | 395/325 |

*Primary Examiner*—Debra A. Chun
*Attorney, Agent, or Firm*—Blakely Sokoloff Taylor & Zafman

[57] ABSTRACT

An improved high speed bus and protocol are disclosed that are capable of transferring data in multiple modes. The bus is particularly useful in computer systems that require data transfer between a variety of computer peripheral memory devices. In base transfer mode, the bus is capable of a maximum of 32-bit data transfers while in extended transfer mode, the bus is capable of a maximum of 64-bit data transfers. The bus comprises a plurality of lines including address lines, size lines, data lines and various control lines. In its extended transfer mode, the bus is capable of employing a number of address and control lines as data transfer lines. The bus is also capable of disabling a device when the device is accessed in a transfer mode that the device does not support.

2 Claims, 9 Drawing Sheets

| NAME | NUMBER OF LINES | DRIVEN BY |
|---|---|---|
| CLOCK SIGNAL LINE 40 | 1 | CONTROLLER |
| ADDRESS STROBE LINE 41 | 1 | CONTROLLER |
| PHYSICAL ADDRESS LINES 42 | 28 | CONTROLLER |
| VIRTUAL ADDRESS/DATA LINES 43 | 32 | MASTERS/SLAVES |
| SIZE LINES 44 | 3 | MASTERS |
| READ/WRITE LINE 45 | 1 | MASTERS |
| ACKNOWLEDGE LINES 46 | 3 | SLAVES/CONTROLLER |
| LATE ERROR LINE 47 | 1 | SLAVES |
| BUS REQUEST LINE 48 | 1 PER MASTER | MASTERS |
| BUS GRANT LINE 49 | 1 PER MASTER | CONTROLLER |
| SLAVE SELECT LINE 53 | 1 PER SLAVE | CONTROLLER |
| CONTROL LINES 55 | AS NEEDED | AS NEEDED |

| LINE 1 | LINE 2 | LINE 3 | DEFINITION |
|---|---|---|---|
| 1 | 1 | 1 | IDLE/WAIT |
| 1 | 1 | 0 | ERROR ACKNOWLEDGMENT |
| 1 | 0 | 1 | BYTE (DATA) ACKNOWLEDGMENT |
| 1 | 0 | 0 | RERUN ACKNOWLEDGMENT |
| 0 | 1 | 1 | WORD (DATA) ACKNOWLEDGMENT |
| 0 | 1 | 0 | DOUBLE-WORD (DATA) ACKNOWLEDGMENT |
| 0 | 0 | 1 | HALF-WORD (DATA) ACKNOWLEDGMENT |
| 0 | 0 | 0 | RESERVED |

*Figure 6*

| LINE 1 | LINE 2 | LINE 3 | DEFINITION |
|--------|--------|--------|------------|
| 0 | 0 | 0 | WORD (FOUR BYTE) TRANSFER |
| 0 | 0 | 1 | BYTE TRANSFER |
| 0 | 1 | 0 | HALF-WORD (TWO BYTE) TRANSFER |
| 0 | 1 | 1 | EXTENDED TRANSFER |
| 1 | 0 | 0 | FOUR WORD BURST (16 BYTES) |
| 1 | 0 | 1 | EIGHT WORD BURST (32 BYTES) |
| 1 | 1 | 0 | SIXTEEN WORD BURST (64 BYTES) |
| 1 | 1 | 1 | TWO WORD BURST (8 BYTES) |

METHOD AND APPARATUS FOR SUPPORTING A DUAL BIT LENGTH PROTOCOL FOR DATA TRANSFERS

BACKGROUND OF THE INVENTION

1. Field of the Invention

The present invention relates to a method and apparatus for transferring data among various components of a computer system. More particularly, the present invention relates to an improved computer bus that is capable of transferring data at an increased rate by using address and control lines to transfer data during part of a bus cycle.

2. Art Background

In a typical computer system, a central processing unit (CPU) reads from, and writes data to, peripheral devices and other components which comprise the data processing system. This communication between devices is frequently accomplished by means of a bus that interconnects all of the components of the computer system. The speed at which the bus transfers data directly limits the overall speed of the computer system. An example of a bus may be found in U.S. patent application Ser. No. 387,599, filed Jun. 28, 1989, titled High Speed Bus with Virtual Memory Data Transfer Capability.

A common constraint on the data transfer rate between components coupled to a bus is the size of the bus itself. Essentially, a bus is a collection of wires connecting the various components of a computer system. In addition to address lines, size lines and data lines, the bus will typically contain clock signal lines, power lines, and other control lines. As a general rule, the speed of the bus can be increased simply by adding more lines to the bus. This allows the bus to carry more data during each clock cycle. For example, a computer system which normally transfers data across 32 lines is able to transfer 4 bytes of data each clock cycle. If 64 data lines are used, the computer system is able to transfer 8 bytes of data each clock cycle. Therefore, increasing the number of available data lines proportionately increases the rate at which a bus may transfer data.

However, simply increasing the number lines in a bus may not lead to a desirable result. Buses that contain a large number of lines are subject to two significant disadvantages when compared to smaller buses. First, they are costly and more difficult to design and build. Second, because of the increased number of connections and interfaces and the greater potential for interference, large buses are generally more likely to malfunction than small buses. Therefore, a balance must be sought between the competing goals of increasing the number of lines in a bus to obtain higher data transfer rates and minimizing the number of lines in a bus to reduce cost and improve reliability.

An additional consideration when designing a bus is the compatibility of different types of peripheral devices which may connect to the bus. A computer system may contain various devices which are capable of operating at different data transfer rates. If a number of different devices are present in the computer system, it is essential that a bus have the flexibility to operate at different rates of transfer so that it is capable of communicating with each device at the fastest possible rate. Furthermore, if some of the devices are limited to only one rate of transfer it is also desirable that a means be provided that can disable a device when it is accessed in a transfer rate which the device does not support.

Two types of buses are currently in use; a multiplexed address bus and non-multiplexed address bus. In a multiplexed address bus, address and data travel over the same wires at different times. In a non-multiplexed address bus, address and data travel over different wires at the same time.

SUMMARY OF THE INVENTION

It is therefore an object of the present invention to increase the overall speed of a computer system by providing a bus that is capable of transferring data among various components of a computer system at a high rate.

It is a further object of the invention to reduce cost and increase reliability of the bus by minimizing the total number of lines contained in the the bus.

It is an object of the present invention is to provide a means in which the same bus may be used either as a multiplexed 64-bit bits bus or as a non-multiplexed 32-bit bus.

It is further an object of the present invention to provide a multiple mode bus in which the determination of which type of bus mode to be used for a bus cycle may be determined dynamically.

It is an object of the present invention to provide a bus in which it is possible to intermix devices that support only one of the modes without risk of failure or interference in the bus.

In accordance with the objects of the present invention, an improved high speed bus and protocol are disclosed that are capable of two modes of transfer operations; base mode and extended mode. In base transfer mode the bus is capable of a maximum of 32-bit data transfers per clock cycle and in extended transfer mode the bus is capable of a maximum of 64-bit data transfers per clock cycle. The bus comprises a plurality of lines including address lines, size lines, data lines and a minimum number of control lines. During at least part of every bus cycle in the base transfer mode, certain address and control lines are inactive and transmit a constant signal. These lines are referred to as stable lines. The present invention is able to achieve the object of minimizing the total number of lines in the bus by utilizing the stable lines to transfer data during the extended transfer mode. In addition to performing other functions during part of the bus cycle, the stable lines are able to transmit data in the extended transfer mode during the period they would otherwise be stable.

In accordance with other objects of the invention a means is provided for disabling devices that are not capable of supporting the extended transfer mode. As part of the extended transfer mode protocol of the present invention, the read/write line of the bus is driven by the master device to indicate that write operation is to be performed regardless of the actual operation. Devices that are not capable of supporting the protocol of the extended transfer mode will determine that a write operation is being performed. Accordingly, these devices will not activate their output drivers to erroneously write on the data line of the bus and interfere with the operation of the master device.

BRIEF DESCRIPTION OF THE DRAWINGS

The objects, features and advantages of the present invention will be apparent from the following detained description in which.

DETAILED DESCRIPTION OF THE INVENTION

In the following description, particular specifications are disclosed when describing the various embodiments of the invention. These specifications are intended to provide an illustration of a specific application of the invention but are not intended to limit the computer system to which the invention may be applied. It will be apparent to one skilled in the art that the present invention may be practiced in a system with a wide range of specifications and configurations. The following description also contains circuits and components which are well known in the art. In some instances, well known circuits and components are described or shown in a simplified manner in order not to obscure the present invention unnecessarily.

To provide the flexibility to function as a multiplexed 64 bit bus or a non-multiplexed 32 bit bus and dynamically determine the type of mode at each bus cycle, the present invention is capable of transferring data in at least two modes of operation; base transfer mode and extended transfer mode. In the extended transfer mode, the bus is capable of significantly increasing the rate at which data can be transferred between components of a computer system as compared to the base transfer mode. The extended transfer mode is able to achieve faster transfer rates by employing more data transfer lines than the base transfer mode. In the preferred embodiment of the present invention, the base transfer mode uses 32 lines to transfer data between devices while the extended transfer mode uses 64 lines. This is referred to in the art as 32-bit and 64-bit data transfers respectively. However, the bus of the present invention avoids increased cost and poor reliability by utilizing the same total number of lines in each transfer mode.

Although the preferred embodiment of the present invention incorporates a number of improvements with regard to the base transfer mode, this description of the preferred embodiment will concentrate on the extended transfer mode capability of the invention. Particular emphasis will be placed on the differences between the base mode protocol and the extended mode protocols. A discussion of some aspects of the base transfer mode can be found in U.S. patent application Ser. No. 387,599, filed Jun. 28, 1989, and assigned to the assignee of the present invention.

Figure 1:
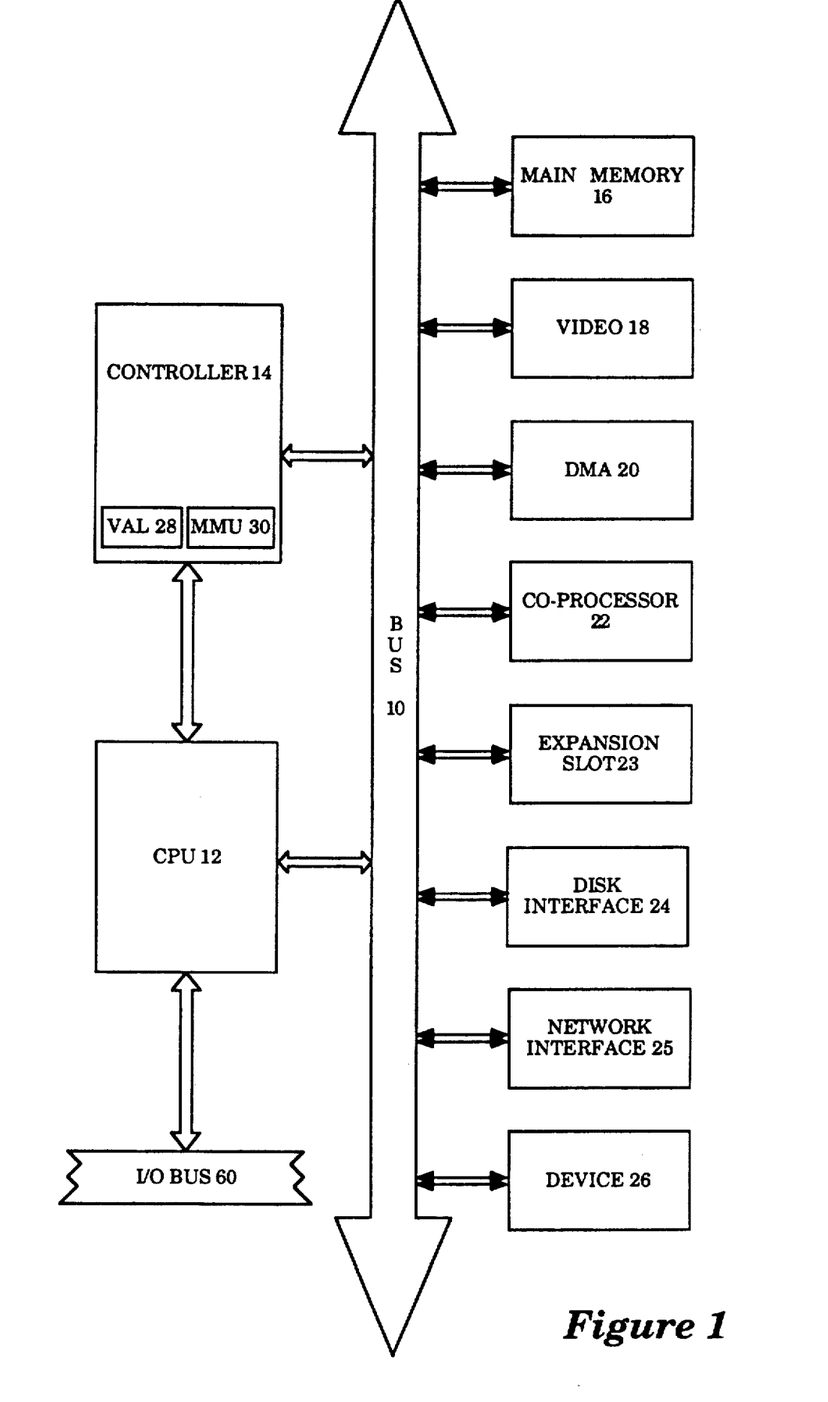
FIG. 1 is a schematic representation of a computer system employing the preferred embodiment of the present invention.

The major components of a computer system employing the present invention are shown in FIG. 1. A central processing unit (CPU) 12 communicates with the elements of the computer system over a bus 10. Alternately, the CPU communicates via the controller 14. The bus 10 includes a plurality of individual lines which carry data and control signals to various components of the computer system. For example, the system may include such peripheral devices as main memory 16, a video device 18, a Direct Memory Access (DMA) device 20, a co-processor 22, an expansion slot 23, a disk interface 24, and a network interface 25. Additional units such as accelerators or expanded memory may be added to the system in a manner that is well in the art. For the purpose of this description, all data processing and peripheral devices which are coupled to the bus 10 of the present invention are collectively referred to as "devices" and given the general reference numeral 26. A device 26 which initiates an operation is referred to as a master device while a device 26 which is an object of the operation is referred to as a slave device. Any master device on the bus 10 may communicate with any slave device on the bus 10 regardless of the system configuration.

The present invention also comprises a controller 14 which is coupled to the bus 10. The controller 14 controls and allocates access to the bus 10 among the various devices. The computer system may also include a virtual address latch 28 and a memory management unit 30 which are shown as components of the controller 14. Furthermore, the computer system may be provided with a separate input/output (I/O) bus 60 for communication with other systems that may not utilize the same communication protocols used in the present invention. This I/O bus 60 may use any one of a number of communication schemes that are well-known in the art. Of course, it will be apparent to those skilled in the art that the present bus system can be used to communicate with external devices if those devices use or understand the protocols of the present invention.

The present invention is intended to provide a means for the various elements of the computer system to communicate with each other. It has been found that the present invention is particularly suited for communication among high performance chip-level devices such as processors and memory where the bus is not required to span a large distance. It should be noted that FIG. 1 represents a symmetric computer system as an example of one possible configuration to which the present invention may be applied. However, the present invention is readily adaptable to other system configurations such as a host-based system.

In the preferred embodiment of the present invention, the computer bus is designed to be used with CMOS technology. As such, certain power specifications and timing protocols are optimized to reduce power consumption and work efficiently with CMOS devices. It will be apparent to those skilled in the art that those specifications may be changed to work with other device technologies without departing from the spirit and scope of the present invention.

Figure 2:
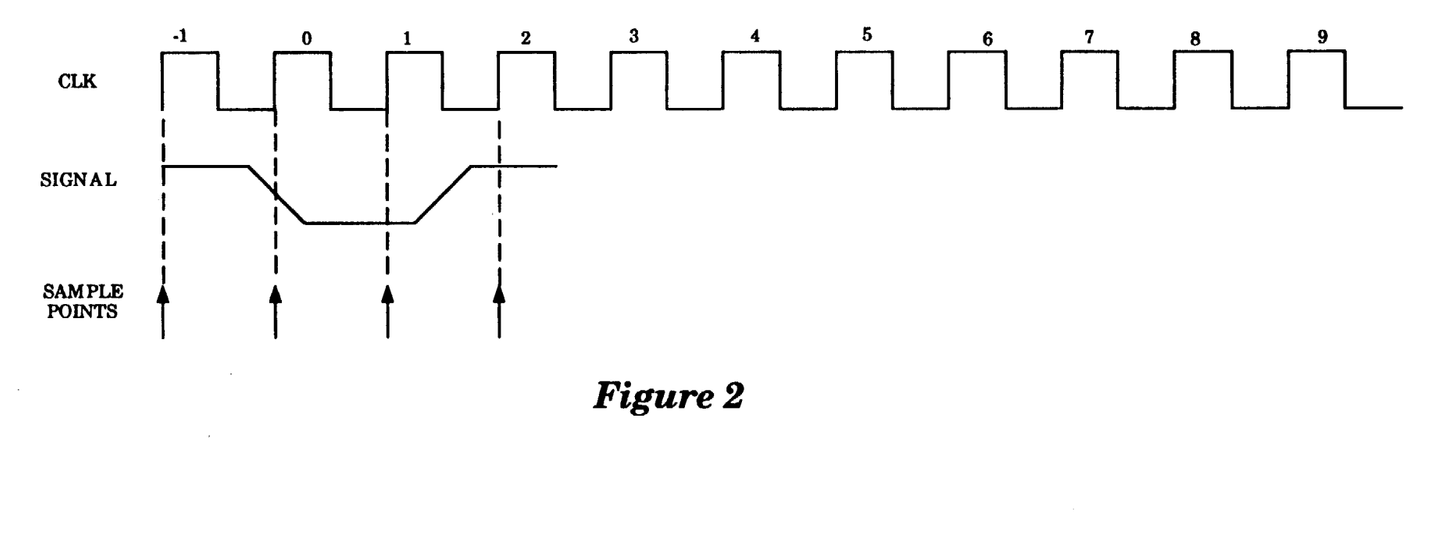
FIG. 2 is a timing diagram showing the synchronous sampling characteristic of the present invention.

The computer bus of the present invention is synchronous with all devices which are interfaced to the bus 10. The controller 14 generates and transmits a fixed-frequency clock signal on a designated line across the bus 10. As seen in FIG. 2, all devices sample bus signals on the rising edge of the clock signal. It will be appreciated that sampling on the rising edge of the clock signal is a matter of design choice and that the present invention could be made completely synchronous by sampling on the falling edges of the clock signal. Furthermore, the protocol described herein may be applied to asynchronous buses and devices.

Figure 3:
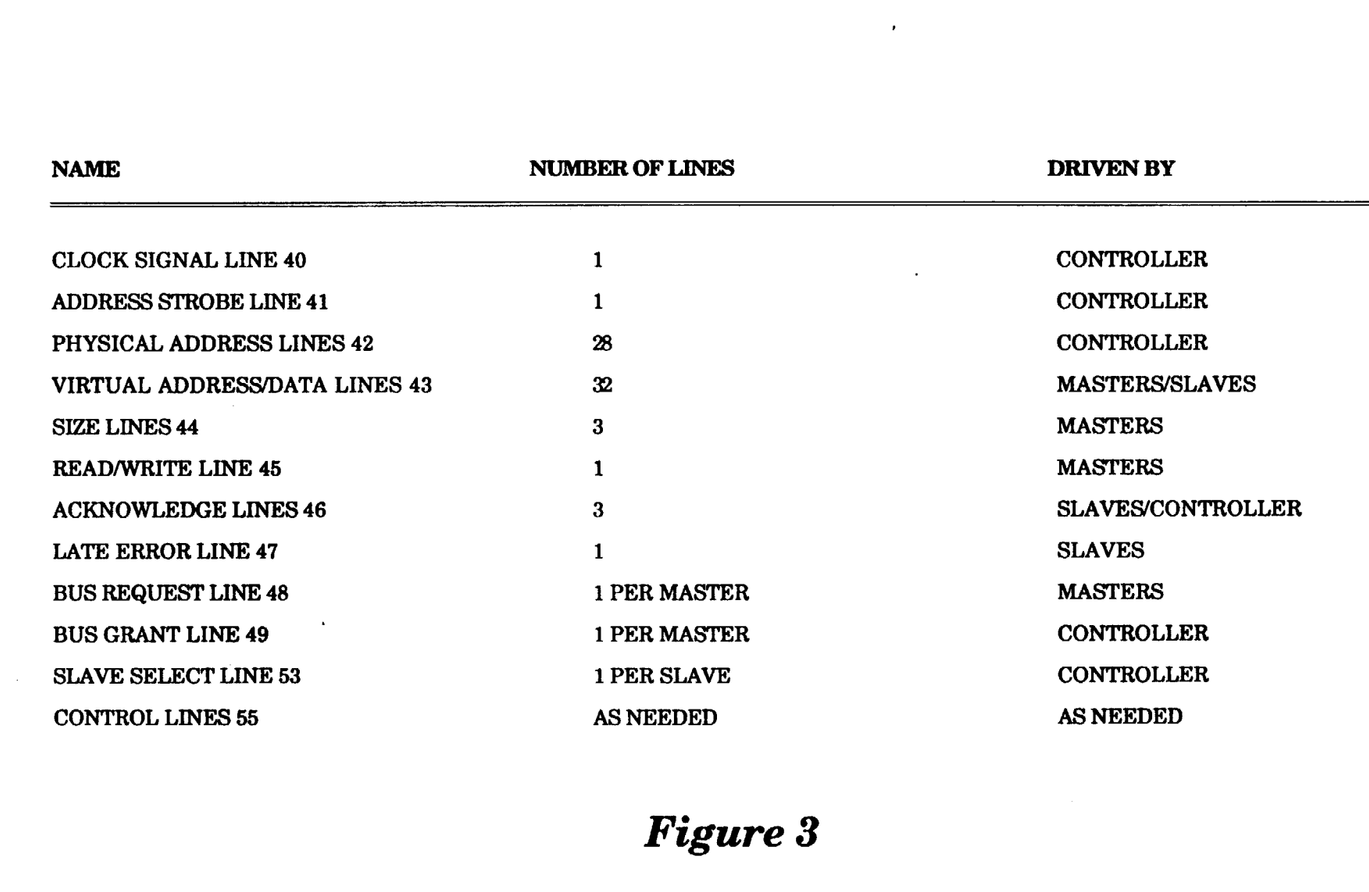
FIG. 3 is a chart showing, in tabular form, the possible types and numbers of lines used in the present invention.

In the preferred embodiment of the present invention, the bus 10 includes eleven basic signal lines, plus three lines per each device connected to the bus. FIG. 3 is a table disclosing the names, number of lines and drivers of some of the possible lines which comprise the present invention. The bus 10 includes a clock line 40 for transmitting a clock signal, an address strobe line 41 for signaling a slave device that a slave cycle is in progress, twenty eight physical address lines 42 for signaling the address of an operation, thirty two virtual address/data lines 43 for transmitting virtual addresses and data and three size lines 44 for transmitting the size of a data transfer. The bus 10 further includes a read/write line 45 for indicating whether an operation is a read or a write operation, three transfer acknowledge lines 46 for acknowledging a transaction, a late error line 47 for signaling the occurrence of an error, a bus request line 48 and a bus grant line 49 for each master device for requesting and granting access to the bus respectively.

The bus 10 may also include a number of command and control lines which perform various functions on the bus. For purposes of this specification, these lines are referred to generally as control lines 55. Control lines 55 may include a request line which would allow a device to interrupt a bus operation needed to complete a high priority task. Control lines 55 may also include a reset line, and a data parity line. Ground lines and power lines, which are collectively referred to as power lines, are also included.

Figure 4:
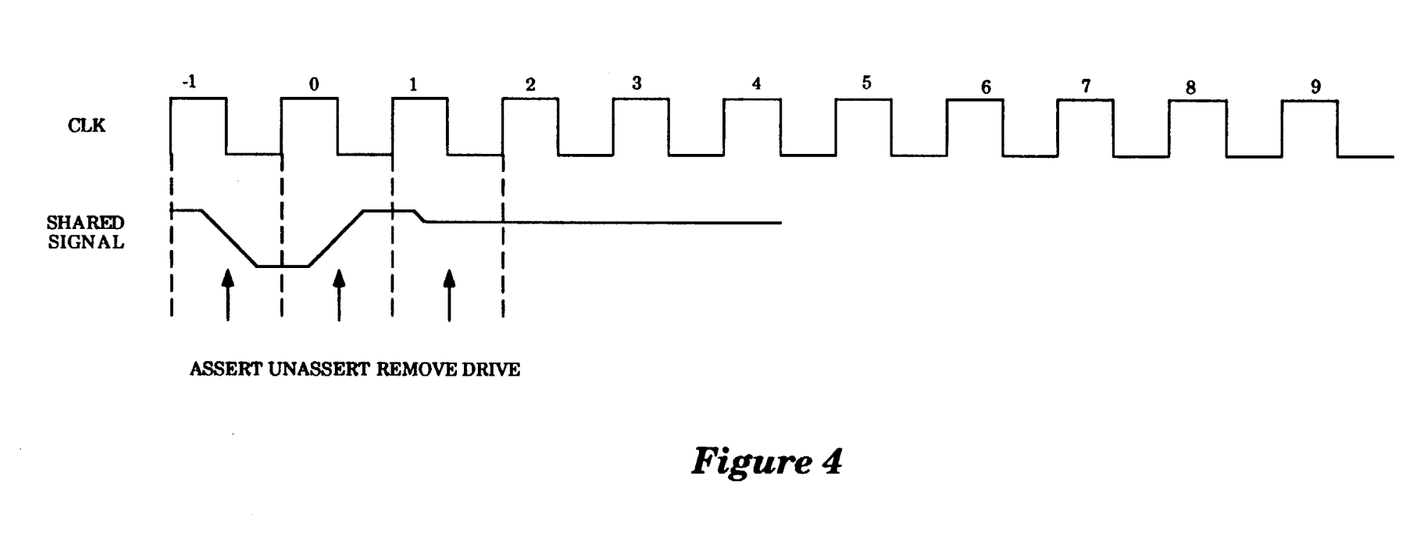
FIG. 4 is a timing diagram showing the protocols for a tristated signal used in the present invention.

As shown in FIG. 4, the present invention utilizes a technique for removing a signal from a line, referred to herein as "active tristating". An active tristated signal is achieved by actively driving the signal to its unasserted level before the source ceases to drive the signal line. It has been found that an active tristated line may be driven at high speeds without the need for low-resistance pullup resistors, as is typically found in the prior art. The active tristatable lines are provided with passive resistors or holding amplifiers that do not change the state of the signal from active to inactive but merely maintain the signal on the control line at its inactive level or undriven level.

Figure 5:
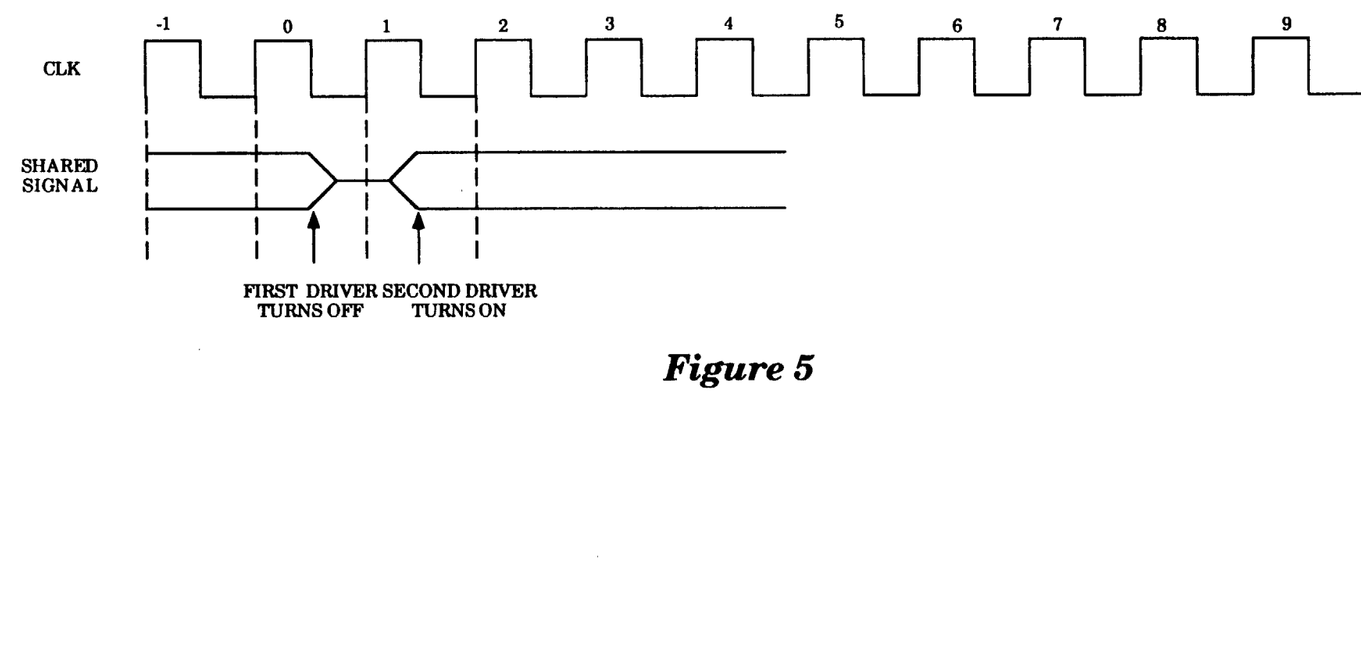
FIG. 5 is a timing diagram showing the non-overlap protocol used in the present invention.

Another feature of the bus of the present invention is the fact that no driver overlap occurs in the computer bus. A driver overlap signal exists when two or more drivers assert a signal across the same line during the same clock cycle. If this is allowed to occur an error condition is created resulting in unreliable operation an excessive power dissipation. As shown in FIG. 5, the protocol of the present invention prevents driver overlap by requiring a one clock cycle gap between the time an active driver is deactivated and the time a new drive is activated. At the rising edge of a first clock cycle, the driver for the device which is driving a particular bus line is deactivated. If the bus line is an active tristatable line it will be maintained at its tristated level by its passive resistor by the end of the first clock cycle. When the rising edge of the second clock cycle is detected, the previously inactive driver of a second device will assert a signal and drive the line to the desired level. The protocol of the present invention requires that the second device not activate its driver until the clock cycle after it has detected the tristated or inactive level.

Figure 6:
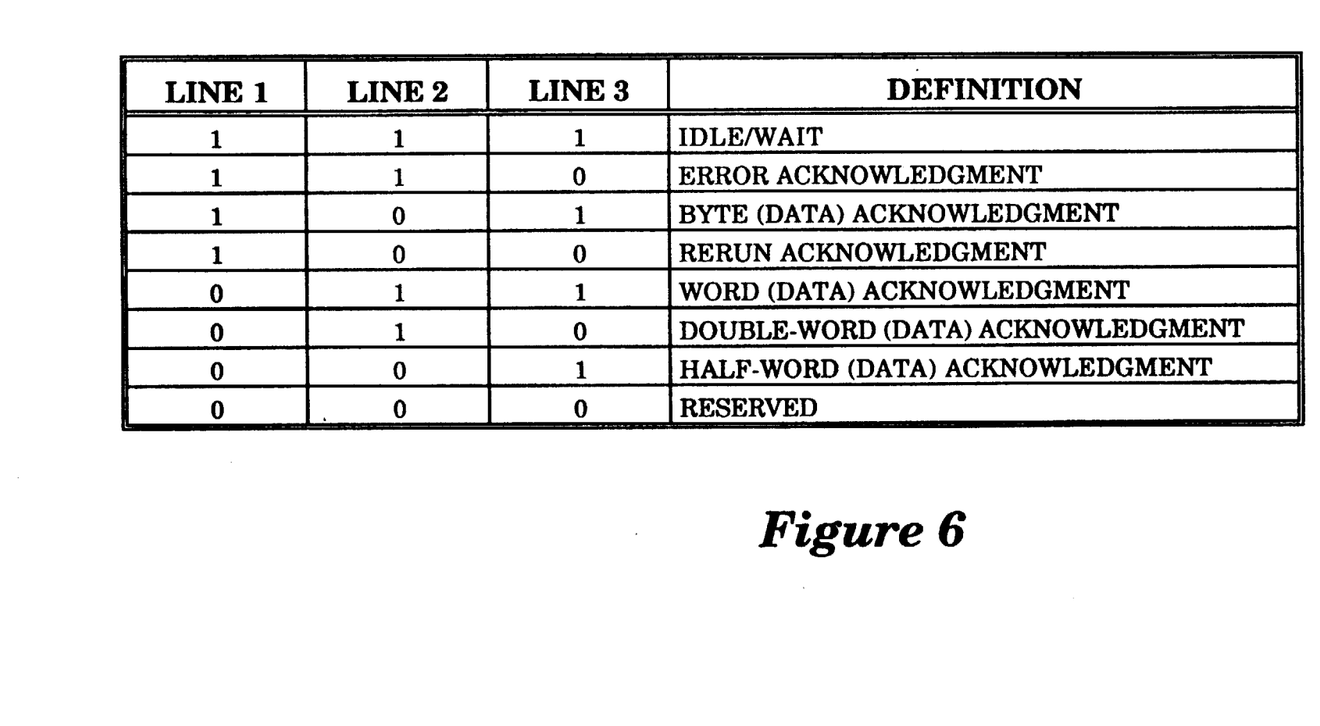
FIG. 6 is a chart showing, in tabular form, the definitions of the possible encoded responses of the acknowledgment lines of the present invention.

FIG. 6 is a table that discloses the definitions of the various encodings of the acknowledgement lines 46 that are utilized by devices to acknowledge a transaction. In the preferred embodiment of the present invention, the acknowledgement lines 46 comprise at least three separate lines. At the end of each bus cycle, the slave device transmits an acknowledgement signal that can be one of three general types; data acknowledgements, error acknowledgements or rerun acknowledgements. Data acknowledgements indicate the successful transfer of a particular quantity of data between a master device and slave device, error acknowledgements indicate that the attempted transfer was unsuccessful and rerun acknowledgments indicate that the selected slave was unable to perform the requested transfer and that the master must re-attempt the operation.

Figure 7:
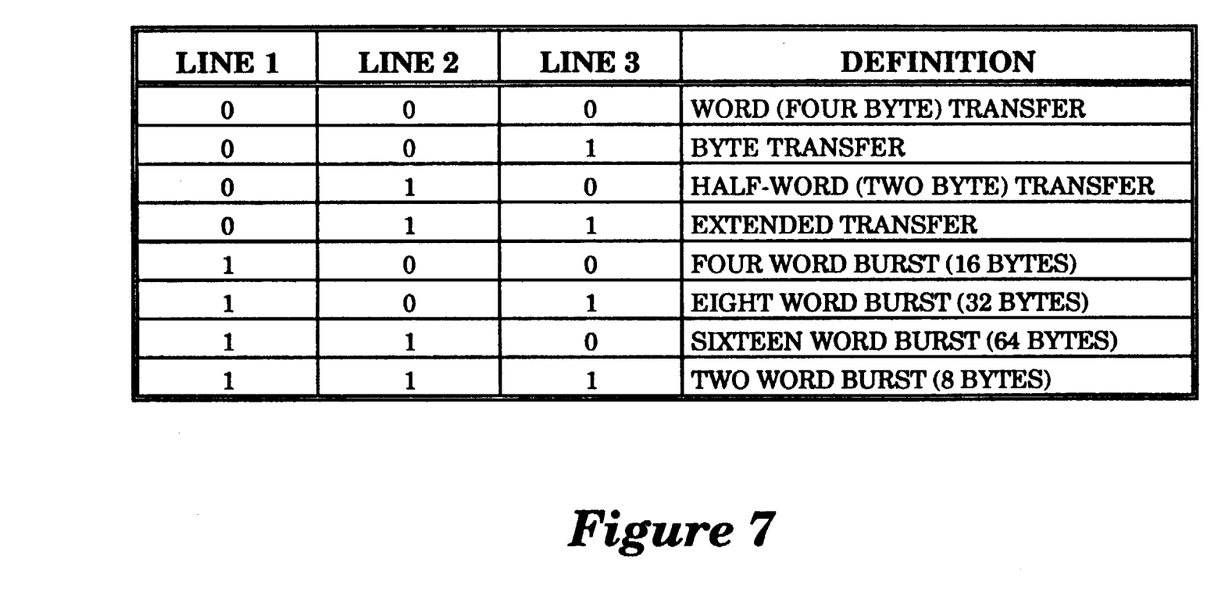
FIG. 7 is a chart showing in tabular form, the definitions of the possible encoded signals of the size lines of the present invention.

FIG. 7 is a table disclosing the definitions of the various encodings of the size lines 44. In the preferred embodiment of the present invention, the size lines 44 may comprise at least three separate lines. A master device uses the size lines to transmit the size of the data to be transferred to a slave device during a particular operation. The size may range from a single byte to a sixteen byte word burst. The size lines 44 are also used to indicate that the master device is about to perform an operation in the extended transfer mode. As shall be discussed below, the actual size of the operation in the extended transfer mode is transmitted in a "descriptor" over the virtual address/data lines 43.

Figure 8:
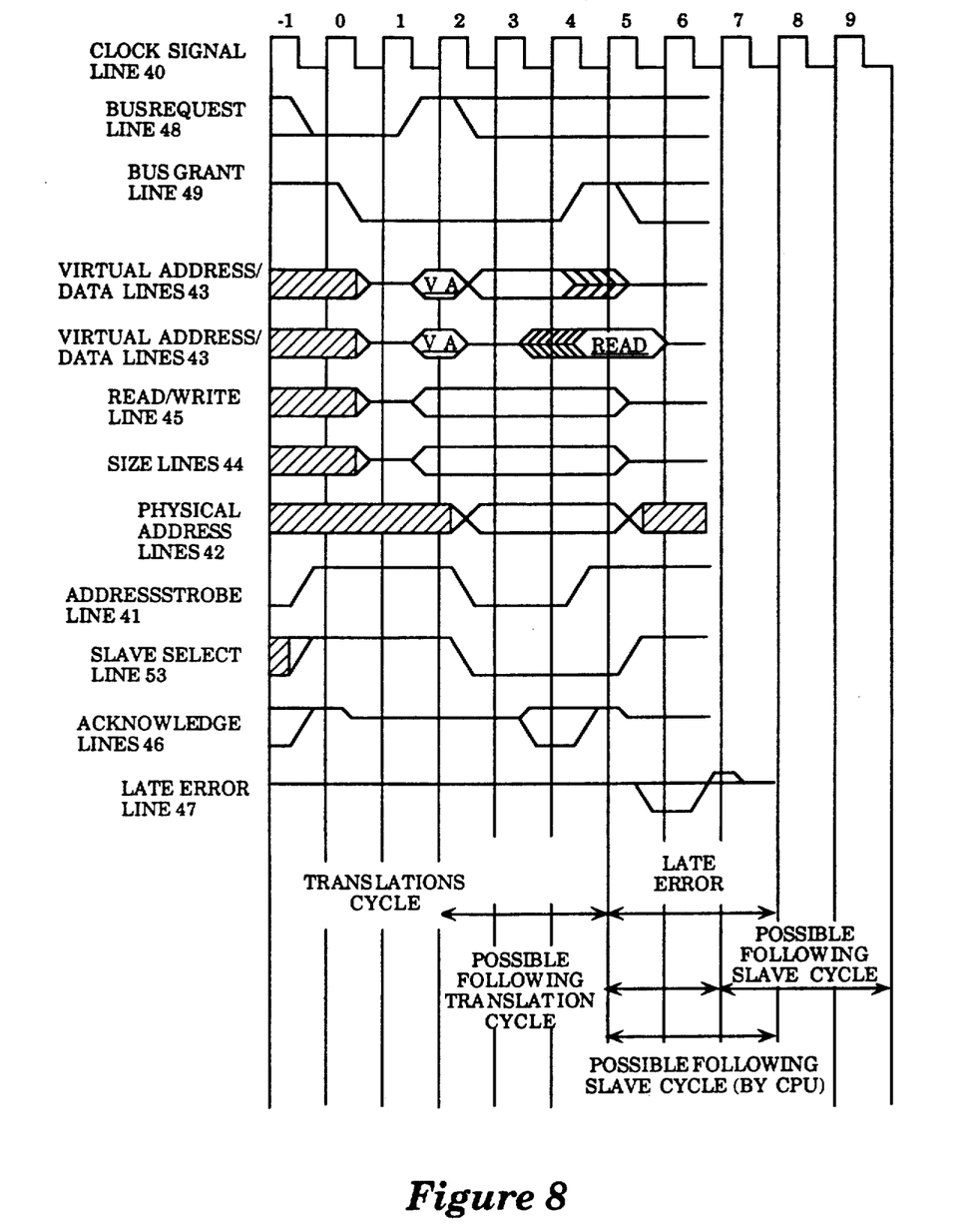
FIG. 8 is a timing diagram for a typical operation using the protocol of the base transfer mode of the present invention.

The operation of the bus of the present invention in the base transfer mode will now discussed with reference to FIG. 8. In general, every operation or bus cycle can be divided into two subcycles; a translation cycle and a slave cycle. The primary operation performed during the translation cycle is the translation of a virtual address to a physical address while the primary operation performed in the slave cycle is the transfer of data to or from the slave device.

Every bus cycle on the bus 10 begins with a device 26 asserting a bus request signal over its particular bus request line 48. The controller 14 receives all such requests, prioritizes and stores them, waits until the bus is idle and asserts a bus grant signal over the bus grant line 49 to the requesting device 26. After receiving the grant signal, the requesting device begins the translation cycle. At this point the requesting device becomes the master device.

The translation cycle commences in the clock cycle following the bus grant signal with the master device driving a virtual address onto the virtual address/data lines 43, a read or write signal over the read/write signal line 45 (depending upon whether the device will perform a read or write operation) and a size signal over the size lines 44. The virtual address latch 28 of the controller latches the virtual address and the memory management unit 30 immediately begins translating the virtual address into a corresponding physical address. It should be noted that FIG. 8 is only representative of a typical bus cycle and that many variations are possible. For example, the translation of the virtual address into the physical address is shown to take only one clock cycle; however, the translation may be permitted to take a greater number of clock cycles if it is necessary.

Once the controller asserts a physical address on to the physical address lines 42, the translation cycle ends and the slave cycle begins. Concurrently with driving the physical address, the controller will assert an address strobe signal on address strobe line 41 and assert a slave select signal on slave select line 53. The address strobe signal provides a means for indicating that a slave cycle is in progress. The slave select signal serves to designate the particular slave device that is to be used in the operation. In the preferred embodiment of the present invention, the bus 10 is a geographically-addressed bus which requires that each slave device receive a signal on its slave select line 53. The controller must drive the slave select line 53 which corresponds to the virtual address presented by the master device.

As soon as the physical address is asserted, the master device may begin an operation. In FIG. 8, two alternative operations are represented by the read data line and the write data line. Once the operation begins, the selected slave device has up to 255 clock cycles to perform the requested transfer and issue a non-idle acknowledgement signal on the acknowledgement lines 46. The 255 clock cycle limitation is a timeout requirement that assures that the master device will not continue to address a slave device that is not operating, as in the case when the master device mistakenly addresses a location that has no slave device.

If the slave device detects an error during an operation it can assert a signal on the late error line 47. The late error signal is only used in those situations where it is impossible to signal the error using the acknowledge lines 46. Such a situation may arise when the controller 14 has de-asserted the slave select signal on the the slave select line 53 after a particular operation has been completed. Each late error signal corresponds to the operation performed after the most recent acknowledgement signal. No specific interpretation is implied by the late error signal; the action taken in response to its assertion is dependent on the current master device and its operation. A typical base transfer mode operation ends when the controller 14 de-asserts the address strobe signal on the address strobe line 41.

During 32-bit data transfer operations, there are a number of lines which remain constant during part of each bus cycle. These lines are said to be "stable". In the preferred embodiment of the present invention, the twenty-eight physical address lines 42, the three size lines 44 and the read signal lines 45 are stable during part of each bus cycle in the base transfer mode. These lines change state only once during the first portion of a 32-bit slave cycle and then remain constant for the remainder of the subcycle.

The present invention takes advantage of this characteristic to allow the bus to operate in a 64-bit extended transfer mode. During the portion of the bus cycle that the physical address lines 42, the size lines 44 and the read/write lines would otherwise be stable, the lines are used to transfer data as a data transfer line would be used. Combining these lines with the thirty-two lines already designated as data lines, provides the bus of the present invention 64 lines upon which data may be transferred. The advantage to this approach is that it can double the peak transfer rate of the bus.

Figure 9:
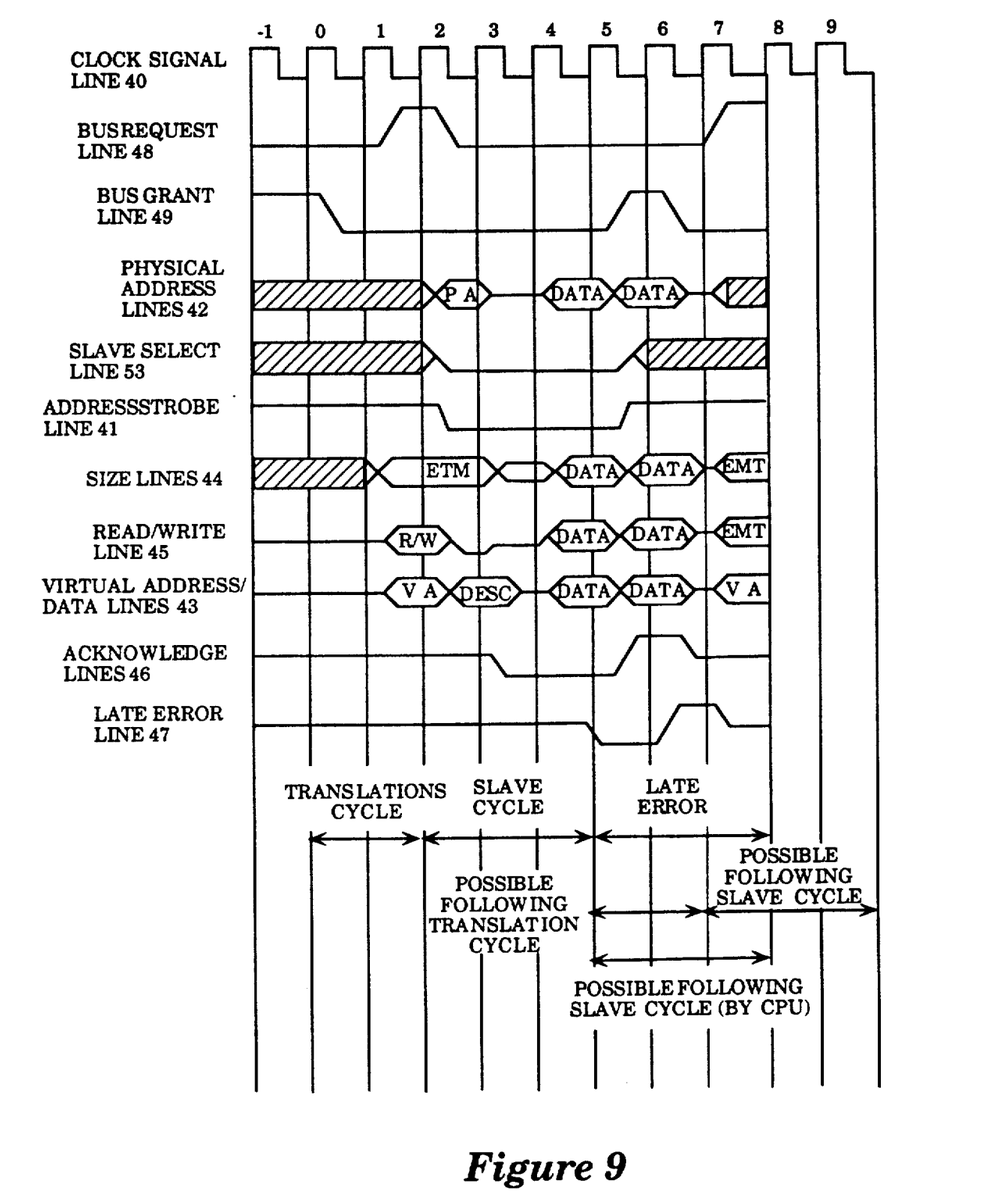
FIG. 9 is a timing diagram for a typical operation using the protocol of the extended transfer made of the present invention.

A clock cycle by clock cycle analysis of the extended transfer mode protocol of the present invention will now be described with reference to FIG. 9. As with the base mode, the extended transfer mode bus cycle consists of two phases; a translation cycle and a slave cycle. Every operation begins with a device asserting a bus request signal over its particular bus request line 48. The controller 14 receives the bus request signal and prioritizes it with respect to other bus request signals it may have received. When the controller 14 determines that the requesting device has priority, it asserts a bus grant signal across bus grant line 49. After receiving the grant signal, the requesting device begins the translation cycle.

The translation cycle commences with the master device driving a virtual address onto the virtual address/data lines 43 and driving the lead signal line 45 to the appropriate state depending upon whether the device will perform a read or write operation. The controller immediately begins translating the virtual address into a corresponding physical address. FIG. 9 indicates a one clock cycle translation time, however, the controller 14 may take more time if it is necessary.

The protocol steps described so far are interchangeable with 32-bit operations. However, the master device must also perform actions that are unique to the extended transfer mode. During the first clock cycle after the bus grant signal is given, the master device must drive the size lines 44 to send the extended transfer mode signal. The extended transfer mode signal, defined in FIG. 7, is used to inform the intended slave device that the bus will be operating in the extended transfer mode and that the slave device should use this protocol. The extended transfer mode allows the bus to perform up to 64-bit transfer operations. Although devices may uses a total of 64 lines to transfer data in the extended transfer mode, devices may also transfer smaller amounts of data it is desired. Whether the master device decides to enter the extended transfer mode or stay in the base mode is dependent upon the master device and the operation it will be performing.

In accordance with an object of the present invention, means are provided that can disable a device that is not capable of supporting the extended transfer mode. Although a master device may be capable of transferring data in the extended transfer mode, it may not be capable of distinguishing which slave devices are capable of supporting this mode. A situation may arise when the master device attempts to perform an operation in the extended transfer mode with a slave device which may be limited to the base transfer mode. Since the slave device is not capable of understanding the extended transfer mode protocol, it may activate its output drivers based only on the information that it received from the address strobe line 41, slave select line 53 and the read/write line 45. The output drivers would then erroneously drive signals across the virtual address/data lines 43 thereby interfering with the operation of the master device and/or causing physical damage to master or slave device circuits.

Therefore, to prevent a base transfer mode slave device from activating its output drivers in the extended transfer mode, the protocol of the bus of the present invention requires the master device to drive a "write" signal on the read/write line 45. This has the desirable effect of preventing the base transfer mode slave device from enabling its output drivers. Interpreting the write signal to mean that a write operation is being performed, the slave device will not activate its output drivers. To do so would be contrary to the protocol of the device. As can be seen in FIG. 9, the write signal on the read/write line 45 is held for only one clock cycle after which the master removes its driving signal and the line is later used to transfer data. However, special bus termination components maintains the R/W signal in the "write" state even after the master removes its driving signal. In this manner, up until the time 64 bit data is actually transferred, a 32 bit slave device will not drive the bus. Slave devices which are capable of operating in the extended transfer mode will not be affected by the write signal because the protocol of the present invention commands them to disregard any signal on the read/write line 45 at this point in the bus cycle. Having received the extended transfer mode signal on the size lines 44, 64-bit capable devices are aware that the master device will be operating in the extended transfer mode and that they should now use the extended transfer mode protocol. Accordingly, these devices will disregard the write signal on the read/write line 45. Later in the bus cycle the 64-bit capable devices will be capable of receiving data from this line should the master device transfer data on it.

In the second clock cycle following the assertion of the bus grant signal, the master device must drive the virtual address/data lines 43 with data that is referred to as the "descriptor". Since the size lines 44 are used to transmit the extended transfer mode signal, it is necessary to use another set of lines to indicate the size of the operation. The descriptor is unique to the extended transfer mode and it contains the transfer size, the type of operation (read or write) and whether it is an atomic transaction (a sequence of bus cycles where the master device retains control of the bus to prevent other master devices from accessing the bus). This information is used by the slave device to perform whatever operation is requested. The master device continues to drive the descriptor information on the virtual address/data lines 43 until the clock cycle following the assertion of the address strobe signal.

After the controller 14 has completed translating the virtual address, it asserts the physical address on the the physical address lines 42, asserts the address strobe signal on address strobe line 41 and asserts a select slave signal on the appropriate select slave line 53. The address strobe signal indicates the beginning of the slave cycle and prompts the selected slave device to latch information which is present on the size lines 44, read/write line 45, the virtual address/data lines 43 and the physical address lines 42. Unlike base transfer mode operations, the physical address is only valid for one clock cycle in the extended transfer mode so that it may subsequently be used in the bus cycle to transfer data. Therefore, it is important that the selected slave device latch this information when it is valid. When the selected slave device latches the information on all of the various lines the slave device is informed that an extended transfer mode operation is to be performed, given the description of the operation from the descriptor and given the physical address of the data. If, on the other hand, the selected device is limited to the base transfer mode, it is told that a write operation is to be performed by the read/write signal and is effectively disabled.

During the clock cycle following the assertion of the address strobe, the master device actively tristates the read line 45, the size lines 44 and the data lines/virtual address lines 43. Concurrently, the controller 14 actively tristates the physical address lines 42. The selected slave device may then drive an acknowledge signal on the acknowledge lines 46. If the selected slave device does not support the extended transfer mode, it must issue an error acknowledgment signal. If the selected slave device does support the extended transfer mode, it will generate a double word acknowledgment. Having received a valid acknowledgment signal, the master device may continue the operation. In the case of a read operation, the slave device must drive the data lines for exactly one clock cycle with the first 8 bytes of data during the clock cycle following its acknowledgment. In the case of a write operation, the master device must drive a double-word of data during the clock cycle following the slave device's acknowledgment. In the clock cycle following the assertion of the acknowledgment signal, the master device may begin the data transfer. In the preferred embodiment of the present invention the physical address lines 42, the data lines/virtual address lines 43, size lines 44 and the read signal line 45 are used to transfer data to the slave device. However, it will be apparent to those skilled in the art that other stable lines could be used to perform the actual data transfer operation.

As with the base transfer mode, a typical operation is ended by the controller when it de-asserts the address strobe signal on the address strobe line 41. It should also be noted that the function and operation of the late error signal and the timeout period remains the same under both transfer modes.

The foregoing specification has described a high speed bus with dual mode data transfer capability. The invention has been described with reference to specific embodiments intended to serve as examples. It will, however, be evident that various modifications and changes may be made without departing from the scope of the invention as set forth in the claims. The specification and claims, therefore, should be regarded in an illustrative rather than a restrictive sense.

I claim:

1. A method of transferring data in a computer system between devices selectively coupled to a bus, comprising the steps of:

transmitting a bus request signal from a master device to a controller device within a first time period of at least one clock cycle;

transmitting a bus grant signal from said controller device to said master device within a second time period of at least one clock cycle;

within a third time period of at least one clock cycle,
applying a virtual address to a plurality of data lines by said master device,
applying a read signal, if a read operation is to be performed, or applying a write signal, if a write operation is to be performed, to a read signal line by said master device, and
applying an extended transfer mode signal to a plurality of size lines by said master device;

within a fourth time period of at least one clock cycle,
translating said virtual address into a corresponding physical address by said controller device,
applying said physical address to a plurality physical address lines by said controller device,
applying a slave select signal to a slave select line by said controller device, said slave select line corresponding to a slave device coupled to said bus, said slave device being selected upon receiving said slave select signal;
applying a descriptor signal to said plurality of data lines by said master device, said descriptor signal including data identifying transfer type, transfer size and atomic operations to said slave device, applying a write signal to said read signal line by said master device, such that if said slave decice is unable to transfer data in an extended transfer mode, said slave device being disabled upon receipt of said write signal, and, applying an address strobe signal generated by said controller to an address strobe line coupled to said slave device, said slave device upon receiving said address strobe signal, latching said physical address on said plurality of physical address lines, said read signal on said read signal line, and said descriptor signal on said plurality of data lines;

within a fifth time period of at least one clock cycle, transmitting an acknowledge signal to a plurality of acknowledge lines by said slave device, said acknowledge signals notifying said controller that said slave device is ready to transfer data, and said controller further tristating said physical address lines, said size lines, said read line and said data lines;

said master device applying data to said physical address lines, size lines, read lines, and data lines in the event of a write operation, within a sixth period of at least one clock cycle;

said slave device applying data to said physical address lines, size lines, read lines, and data lines in the event of a read operation, within said sixth period of at least one clock cycle;

such that data is transferred between said master and slave devices.

2. A computer system including a master device and a slave device coupled to a bus, comprising:

bus request signal means coupled to said master device for transmitting a signal to a controller device coupled to said bus within a first period of at least one clock cycle;

bus grant signal means coupled to said controller device for transmitting a bus grant signal from said controller device to said master device within a second time period of at least one clock cycle;

virtual address generation means coupled to said master device for applying a virtual address to a plurality of data lines comprising said bus and coupled to said controller device and said slave device;

read/write signal generation means coupled to said master device for applying a read signal, if a read operation is performed, or a write signal, if a write operation is performed, to a read signal line comprising said bus;

extended transfer mode signal generation means coupled to said master device for transmitting an extended mode transfer signal on a plurality of size lines comprising said bus and coupled to said slave device;

virtual address translation means coupled to said controller device for receiving said virtual address on said plurality of data lines and translating said virtual address into a corresponding physical address, said controller device applying said physical address to a plurality of physical address lines comprising said bus;

slave select signal controller means coupled to said controller device for transmitting a slave select signal on a slave select line comprising said bus and coupled to said slave device, said slave device being selected upon receiving said slave select signal;

descriptor signal generation means coupled to said master device for transmitting a descriptor signal on said plurality of data lines, said descriptor signal including data identifying transfer type, transfer size and atomic operations to said slave device;

said master device transmitting a write signal on said read signal line such that if said slave device is unable to transfer data in an extended transfer mode, said slave device being disable upon receipt of said write signal;

address strobe generation means coupled to said controller device for transmitting an address generation strobe signal to an address strobe line comprising said bus and coupled to said slave device, said slave device upon receiving said address strobe signal, latching said real address on said plurality of physical address lines, said read signal on said read signal line, and said descriptor signal on said plurality of data lines;

acknowledge signal generation means coupled to said slave device for transmitting an acknowledge signal over a plurality of acknowledge lines comprising said bus and coupled to said controller, said acknowledge signal notifying said controller that said slave device is ready to transfer data; said acknowledge signal being transmitted within a fifth time period of said clock cycle, said controller further tristating said physical address lines, size lines, read line and data lines;

said master device applying data to said physical address lines, size lines, read lines, and data lines in the event of a write operation, within a sixth period of at least one clock cycle;

said slave device applying data to said physical address lines, size lines, read lines and data lines in the event of a read operation, within said sixth period of at least one clock cycle;

such that data is transferred between said master and slave devices.

* * * * *